(12) United States Patent
Zhu et al.

(10) Patent No.: US 12,298,956 B2
(45) Date of Patent: May 13, 2025

(54) METHOD AND APPARATUS FOR GENERATING INDEX, AND ELECTRONIC DEVICE

(71) Applicant: BEIJING BAIDU NETCOM SCIENCE TECHNOLOGY CO., LTD., Beijing (CN)

(72) Inventors: Chenchang Zhu, Beijing (CN); Jialin Feng, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/748,362

(22) Filed: Jun. 20, 2024

(65) Prior Publication Data

US 2025/0013620 A1 Jan. 9, 2025

(30) Foreign Application Priority Data

May 30, 2024 (CN) .......................... 202410686425.6

(51) Int. Cl.
*G06F 16/22* (2019.01)
*G06F 16/2453* (2019.01)

(52) U.S. Cl.
CPC ...... *G06F 16/2272* (2019.01); *G06F 16/2453* (2019.01)

(58) Field of Classification Search
CPC ............. G06F 16/2272; G06F 16/2453; G06F 16/2237; G06F 16/242
See application file for complete search history.

(56) References Cited

U.S. PATENT DOCUMENTS

| | | | | |
|---|---|---|---|---|
| 6,122,628 | A * | 9/2000 | Castelli | G06F 16/2264 707/999.005 |
| 10,949,467 | B2 * | 3/2021 | Lu | G06F 16/901 |
| 2021/0081356 | A1 * | 3/2021 | Shergill | G06F 16/122 |
| 2023/0107652 | A1 * | 4/2023 | Veselova | G06F 16/24542 |
| 2023/0418797 | A1 * | 12/2023 | Chern | G06F 16/2458 |
| 2024/0168978 | A1 * | 5/2024 | Goel | G06F 16/2358 |

(Continued)

OTHER PUBLICATIONS

X. Xie, H. Liu, W. Hou and H. Huang, "A Brief Survey of Vector Databases," 2023 9th International Conference on Big Data and Information Analytics (BigDIA), Haikou, China, 2023, pp. 364-371. (Year: 2023).*

(Continued)

*Primary Examiner* — Kris E Mackes
(74) *Attorney, Agent, or Firm* — Lippes Mathias LLP (57) ABSTRACT

A method for generating an index, and an electronic device are provided. The detailed solution includes: determining a first parameter group and a second parameter group in response to receiving a query request for a first vector database and there being no available index for the first vector database, constructing a first index for the first vector database based on the first parameter group, and querying the first vector database based on the first index; constructing a second index for the first vector database based on the second parameter group in response to meeting a preset condition; and in response to determining that construction of the second index is completed, deleting the first index, and querying the first vector database based on the second index.

20 Claims, 5 Drawing Sheets

(56) References Cited

U.S. PATENT DOCUMENTS

2024/0419674 A1\* 12/2024 Tepper .............. G06F 16/24578

OTHER PUBLICATIONS

Jason Mohoney, Anil Pacaci, Shihabur Rahman Chowdhury, Ali Mousavi, Ihab F. Ilyas, Umar Farooq Minhas, Jeffrey Pound, and Theodoros Rekatsinas. 2023. High-Throughput Vector Similarity Search in Knowledge Graphs. Proc. ACM Manag. Data 1, 2, Article 197 (Jun. 2023), 25 pages. (Year: 2023).\*

\* cited by examiner

METHOD AND APPARATUS FOR GENERATING INDEX, AND ELECTRONIC DEVICE

CROSS-REFERENCE TO RELATED APPLICATION

The present application is based upon and claims priority to Chinese Patent Application No. 2024106864256, filed on May 30, 2024, the entirety contents of which are incorporated herein by reference.

TECHNICAL FIELD

The disclosure relates to a field of computer technologies, particularly to a field of artificial intelligence technologies, such as big data and natural language processing, and more particularly to a method and an apparatus for generating an index, and an electronic device.

BACKGROUND

In the related art, a hierarchical navigable small world (HNSW) is generally employed to construct an index for a vector database. However, presently, the vector database constructed in this way may not give consideration to both a speed of index construction and query effect, which affects the user experience.

SUMMARY

The disclosure aims to solve at least one of the technical problems in the related art to some extents.

A first aspect of embodiments of the disclosure provides a method for generating an index, including:
  determining a first parameter group and a second parameter group in response to receiving a query request for a first vector database and there being no available index for the first vector database, wherein a parameter value in the second parameter group is greater than a corresponding parameter value in the first parameter group;
  constructing a first index for the first vector database based on the first parameter group, and querying the first vector database based on the first index;
  constructing a second index for the first vector database based on the second parameter group in response to meeting a preset condition; and
  in response to determining that construction of the second index is completed, deleting the first index, and querying the first vector database based on the second index.

A second aspect of embodiments of the disclosure provides a computer device, including: a memory, a processor, and a computer program stored in the memory and running on the processor. When the processor is configured to execute the computer program, the method for generating an index according to the first aspect of the embodiments of the disclosure is realized.

A third aspect of embodiments of the disclosure provides a computer-readable storage medium having a computer program stored thereon. When the computer program is executed by a processor, the method for generating an index according to the first aspect of the embodiments of the disclosure is realized.

It should be understood that, descriptions in Summary of the disclosure are not intended to limit an essential or important feature in embodiments of the disclosure, and are also not construed to limit the scope of the disclosure. Other features of the disclosure will be easily understood by following descriptions.

BRIEF DESCRIPTION OF THE DRAWINGS

The accompanying drawings are used to provide a further understanding, and do not constitute a limitation of the disclosure, in which.

DETAILED DESCRIPTION

Description will be made below to exemplary embodiments of the disclosure with reference to accompanying drawings, which includes various details of embodiments of the disclosure to facilitate understanding, and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

The disclosure relates to a field of artificial intelligence technologies, such as big data and natural language processing.

Artificial intelligence (AI) is a new technical science that researches and develops a theory, a method, a technology and an application system for simulating, extending and expanding human intelligence.

Big data refers to a collection of data that may not be captured, managed and processed by a conventional software tool in a certain time range. Big data is a massive, high-growth and diversified information asset with a stronger decision-making power, insight and discovery ability and process optimization ability with aid of a new processing mode.

Natural language processing (NLP) is an interdisciplinary subject in fields of computer science, artificial intelligence and linguistics, which mainly researches how to enable a computer to understand, process, generate and simulate human language, thereby realizing an ability of natural dialogue with human beings.

Processing, such as, acquisition, storage, use, manufacture, transmission, provision and publication of the user's personal information involved in the technical solution of the disclosure is in compliance with relevant laws and regulations, and do not violate public order and morals.

Description will be made below to a method and an apparatus for generating an index and an electronic device according to embodiments of the disclosure with reference to accompanying drawings.

Figure 1:
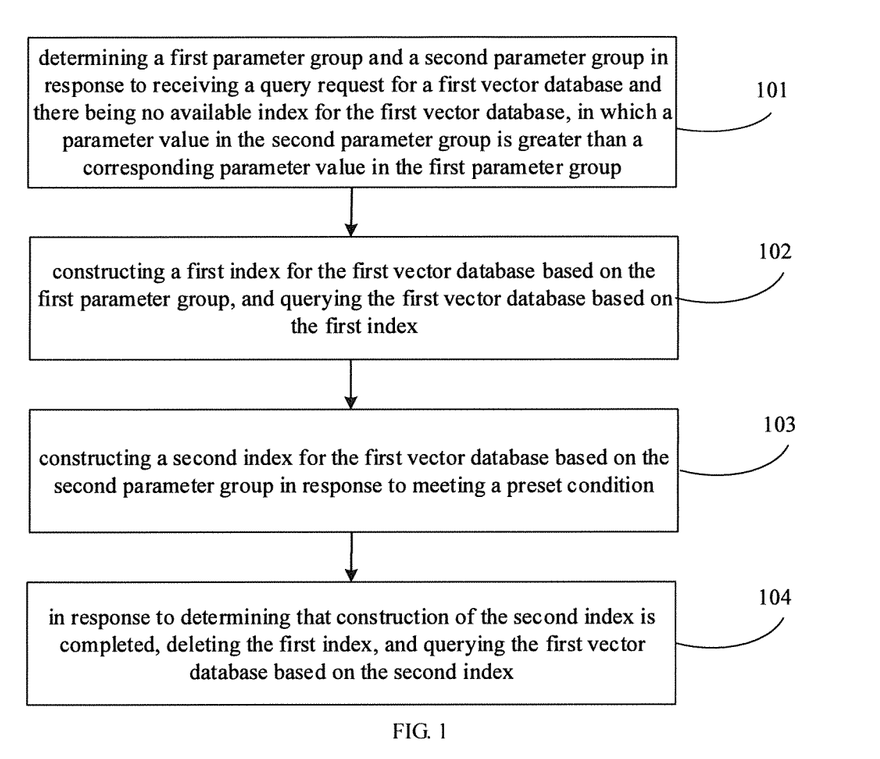
FIG. 1 is a flow chart illustrating a method for generating an index according to an embodiment of the disclosure.

FIG. 1 is a flow chart illustrating a method for generating an index according to an embodiment of the disclosure.

As illustrated in FIG. 1, the method for generating an index may include the following.

At block 101, a first parameter group and a second parameter group are determined in response to receiving a query request for a first vector database and there being no available index for the first vector database, in which a parameter value in the second parameter group is greater than a corresponding parameter value in the first parameter group.

It should be noted that, the first vector database may be any preset vector database, which is not limited by this disclosure.

Both the first parameter group and the second parameter group may be parameter groups including parameters for constructing the index for the first vector database. For example, both the first parameter group and the second parameter group may include a number threshold for neighbor nodes of each vector in the first vector database, the number of candidate neighbor vectors of each vector, etc. The number threshold for neighbor nodes may be a critical value for the neighbor nodes of each vector, which may be preset, and is not limited in the disclosure.

In some possible implementations, the first parameter group and the second parameter group may be determined based on the number of vectors included in the first vector database, thereby ensuring the reliability of the determined first parameter group and the determined second parameter group.

It should be noted that different first parameter groups and different second parameter groups may be determined for different first vector databases including different numbers of vectors, which is not limited in the disclosure.

In some possible implementations, two groups of parameters in any group of preset parameter pairs may be determined as the first parameter group and the second parameter group respectively, thereby improving the accuracy of the determined first parameter group and the determined second parameter group.

The parameter pair may be a parameter pair including the number threshold for the neighbor nodes of each vector in the first vector database and the number of the candidate neighbor vectors of the corresponding vector.

In the disclosure, in order to ensure the user experience, there is a need to construct the index for the first vector database in the case that the query request for the first vector database is received and there is no available index in the first vector database. In this case, the first parameter group and the second parameter group employed to construct the index for the first vector database may be determined based on the number of vectors included in the first vector database or based on the two groups of parameters in any group of preset parameter pairs, thereby providing a condition for constructing the index for the first vector database, and improving the flexibility of determining the parameters for constructing the index for the first vector database.

At block 102, a first index for the first vector database is constructed based on the first parameter group, and the first vector database is queried based on the first index.

It should be noted that, the first index may include vector data in the first vector database and an edge set associated with the vector data. The edge set may include an edge set of neighbor nodes having a connection edge therebetween of the vector data.

In the disclosure, after the first parameter group and the second parameter group are determined, in order to improve a speed for constructing the index for the first vector database and improve the query experience of the user, the first index in the first vector database may be constructed based on the first parameter group, such that the user may query the first vector database based on the first index constructed at a fast speed.

At block 103, a second index for the first vector database is constructed based on the second parameter group in response to meeting a preset condition.

The preset condition may be a condition for judging whether the second index for the first vector database may be constructed based on the second parameter group, which may be any preset condition, and not limited in the disclosure.

It should be noted that, the range of vector data corresponding to the second index is the same as the range of vector data corresponding to the first index, and the range of the edge set in the second index is larger than the range of the edge set in the first index.

In some possible implementations, the preset condition may include at least one of: an amount of remaining resources of a system being greater than a resource amount threshold, a duration in which the amount of remaining resources of a system is greater than a resource amount threshold being greater than a duration threshold; receiving an instruction for constructing the second index; and a current running period being within a preset time range.

The resource amount threshold may be a critical value for the amount of remaining resources of the system for judging whether the second index for the first vector database may be constructed based on the second parameter group, which may be preset, and not limited in the disclosure.

The duration threshold may be a duration critical value for judging whether the remaining resources of the system may be employed to construct the second index, which may be preset, and not limited in the disclosure.

The time range may be a time range for constructing the second index based on the second parameter group, which may be preset, and not limited in the disclosure.

In the disclosure, it may be determined that the current amount of remaining resources of the system meets a resource amount required for constructing the second index based on the second parameter group in the case that the amount of the remaining resources of the system is greater than the resource amount threshold or the duration in which the amount of the remaining resources of the system is greater than the resource amount threshold is greater than the duration threshold. In this case, the second index for the first vector database may be constructed based on the second parameter group. Alternatively, the second index may be constructed based on the second parameter group in the case that the instruction for constructing the second index is received or the current running period is within the preset time range. In this way, a success rate of constructing the second index is improved.

In the disclosure, after the first index is constructed and the first vector database is queried based on the first index, in order to improve the query effect of the first vector database, the second index for the first vector database may be constructed based on the second parameter group.

At block 104, in response to determining that construction of the second index is completed, the first index is deleted, and the first vector database is queried based on the second index.

In the disclosure, when it is determined that the construction of the second index is completed, since a data range corresponding to the second index is the same as that corresponding to the first index, in order to improve the utilization rate of system resources and improve the query effect, the first index may be deleted, and the first vector database may be queried based on the second index.

In the embodiment of the disclosure, the first parameter group and the second parameter group are determined firstly in the case that the query request for the first vector database is received and there is no available index for the first vector database. The first index for the first vector database is constructed based on the first parameter group, and the first vector database is queried based on the first index. Then the second index for the first vector database is constructed based on the second parameter group in the case that the preset condition is met. In the case of determining that the construction of the second index is completed, the first index is deleted and the first vector database is queried based on the second index. In this way, the first index for the first vector database is constructed based on the first parameter group, the second index is constructed based on the second parameter group with greater parameter values in the case that the preset condition is met, and the first index is deleted, such that the efficiency and reliability of generating the index are improved on the basis of improving a speed for constructing the index and a query effect of the index.

Figure 2:
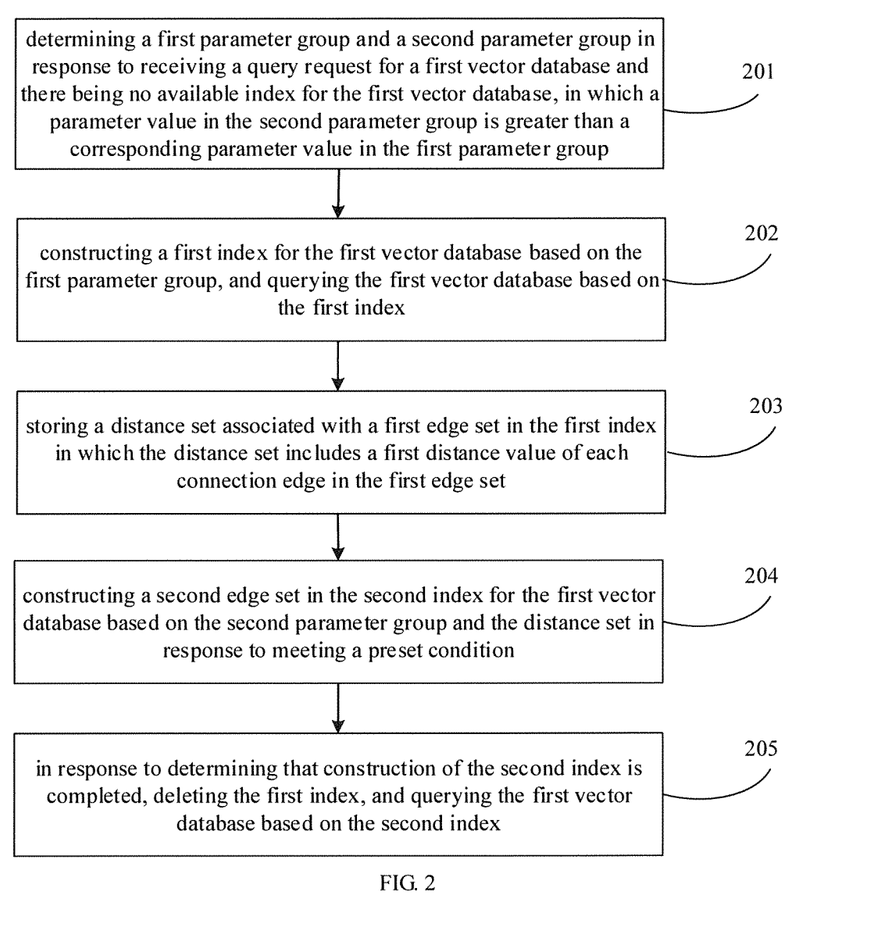
FIG. 2 is a flow chart illustrating a method for generating an index according to an embodiment of the disclosure.

FIG. 2 is a flow chart illustrating a method for generating an index according to an embodiment of the disclosure.

As illustrated in FIG. 2, the method for generating an index may include the following.

At block 201, a first parameter group and a second parameter group are determined in response to receiving a query request for a first vector database and there being no available index for the first vector database, in which a parameter value in the second parameter group is greater than a corresponding parameter value in the first parameter group.

At block 202, a first index for the first vector database is constructed based on the first parameter group, and the first vector database is queried based on the first index.

Regarding a detailed implementation of actions at blocks 201 to 202, reference may be made to the detailed descriptions in other embodiments in the disclosure, which is not described in detail here.

At block 203, a distance set associated with a first edge set in the first index is stored, in which the distance set includes a first distance value of each connection edge in the first edge set.

The first edge set may be an edge set including connection edges between vector nodes and neighbor nodes in the first index.

In the disclosure, after the first index for the first vector database is constructed, the distance set associated with the first edge set in the first index may be stored, thereby providing a data basis for improving the efficiency of constructing the second index.

In the disclosure, taking a hierarchical navigable small world (HNSW) as an example, during generation of the distance set associated with the first edge set, since the distance set may be calculated when a graph is created by the HNSW algorithm, redundant time may not be consumed when the distance set associated with the first edge set is generated. Then the first vector database may generally control the number of nodes of the HNSW by slicing, such that the generated distance set occupies less space, thereby saving the system resource.

The term "HNSW" is an abbreviation of "hierarchical navigable small world".

At block 204, a second edge set in a second index for the first vector database is constructed based on the second parameter group and the distance set in response to meeting a preset condition.

In the disclosure, in the case that the preset condition is met, in order to improve the query effect of the user and the efficiency of constructing the index, the second edge set in the second index for the first vector database may be constructed based on the second parameter group and the distance set.

Figure 3:
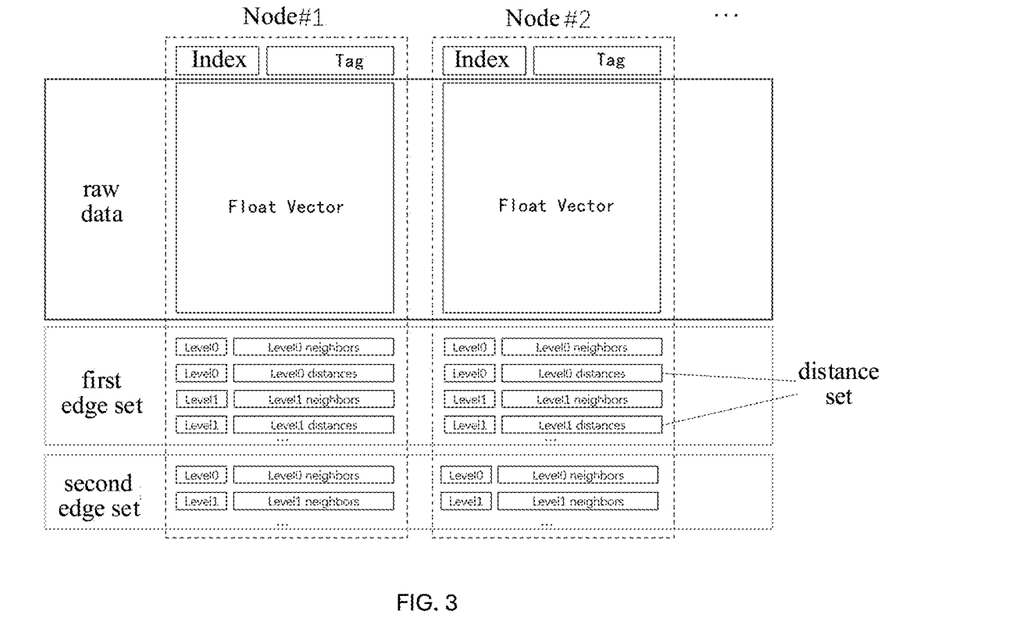
FIG. 3 is a schematic diagram illustrating a first index and a second index constructed according to an embodiment of the disclosure.

An example of constructing the first index and the second index by the method for generating the index according to the disclosure is described below with reference to FIG. 3. FIG. 3 is a schematic diagram illustrating the first index and the second index constructed according to an embodiment of the disclosure. A schematic diagram of indexes of the HNSW is taken as an example in FIG. 3, in which "level" represents a level, "neighbors" may be neighbor nodes corresponding to node #1 or node #2 at each level, "distances" may be a set of distance values of connection edges between node #1 or node #2 and the neighbor nodes at each level.

As illustrated in FIG. 3, the first index constructed for node #1 or node #2 based on the first parameter group may include original data (floating point vector) and the first edge set, and the distance set associated with the first edge set of node #1 or node #2 may be generated simultaneously. In the case that the preset condition is met, the second index for node #1 or node #2 is constructed based on the distance set associated with the first edge set and the second parameter group, and the second index for node #1 or node #2 may include the original data (floating point vector) and the second edge set. It may be seen from FIG. 3 that, an original data range corresponding to the first index for node #1 or node #2 is the same as an original data range corresponding to the second index.

At block 205, in response to determining that construction of the second edge set in the second index is completed, the first index is deleted, and the first vector database is queried based on the second index.

In the disclosure, in the case of determining that the construction of the second edge set in the second index is completed, in order to save the system resource, the first edge set may be deleted, and the first vector data may be queried based on the second index, thereby improving the query effect and enhancing the user experience.

In embodiments of the disclosure, the first parameter group and the second parameter group are determined firstly in the case that the query request for the first vector database is received and there is no available index for the first vector database. The first index for the first vector database is constructed based on the first parameter group, and the first vector database is queried based on the first index. Then the distance set associated with the first edge set in the first index is stored, and the second edge set in the second index for the first vector database is constructed based on the second parameter group and the distance set in the case that the preset condition is met. Finally, in the case of determining that construction of the second edge set in the second index is completed, the first index is deleted, and the first vector database is queried based on the second index. In this way, after the first index for the first vector database is constructed based on the first parameter group, the second index for the first vector database is constructed based on the distance set associated with the first edge set in the first index and the second parameter group in the case that the preset condition is met, such that the efficiency of generating the index is improved and the user experience is improved.

Figure 4:
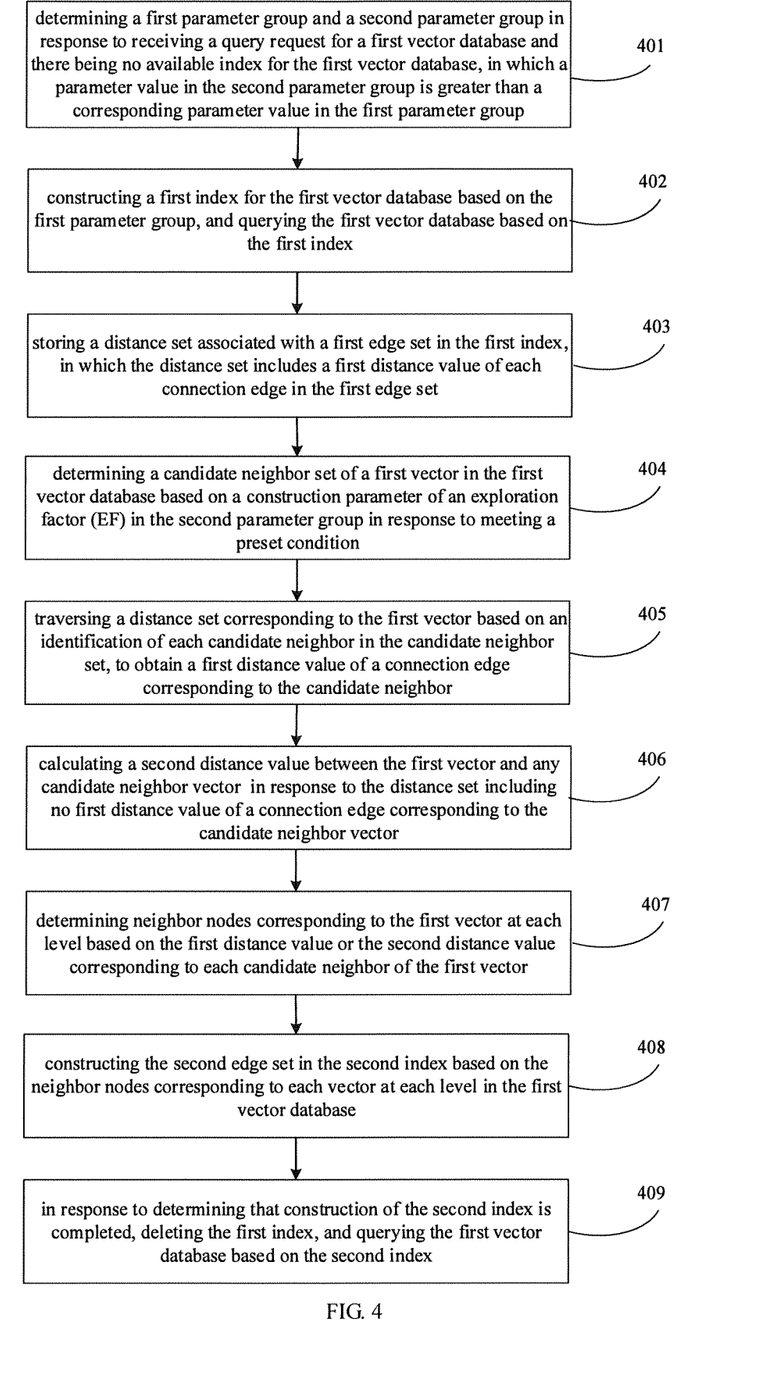
FIG. 4 is a flow chart illustrating a method for generating an index according to an embodiment of the disclosure.

FIG. 4 is a flow chart illustrating a method for generating an index according to an embodiment of the disclosure.

As illustrated in FIG. 4, the method for generating an index may include the following.

At block 401, a first parameter group and a second parameter group are determined in response to receiving a query request for a first vector database and there being no available index for the first vector database, in which a parameter value in the second parameter group is greater than a corresponding parameter value in the first parameter group.

At block 402, a first index for the first vector database is constructed based on the first parameter group, and the first vector database is queried based on the first index.

At block 403, a distance set associated with a first edge set in the first index is stored, in which the distance set includes a first distance value of each connection edge in the first edge set.

Regarding a detailed implementation of the action at blocks 401 to 403, reference may be made to the detailed descriptions in other embodiments in the disclosure, which is not described in detail here.

At block 404, in response to meeting a preset condition, a candidate neighbor set of a first vector in the first vector database is determined based on a construction parameter of an exploration factor (EF) in the second parameter group.

The term "EF" is an abbreviation of "exploration factor".

The construction parameter of the exploration factor (EF) may be configured to determine the number of candidate neighbor vectors of the first vector, which may be any preset value. For example, when the EF is 200, it may be determined that the number of candidate neighbor vectors of the first vector is 200, which is not limited in the disclosure.

It should be noted that, the first vector may be any vector in the first vector database, which is not limited in the disclosure.

The candidate neighbor set may be a set including the candidate neighbor vectors of the first vector.

In the disclosure, in the case that the preset condition is met, the candidate neighbor set of the first vector may be determined based on the construction parameter of the exploration element (EF) in the second parameter group, which provides a condition for constructing the second edge set in the second index.

It should be noted that, different candidate neighbor sets of the first vector may be determined for different construction parameters of the exploration element (EF), which is not limited in this disclosure.

It should be noted that, a value of the construction parameter of the exploration element (EF) in the second parameter group is greater than a value of the construction parameter of the exploration element (EF) in the first parameter group.

At block 405, a distance set corresponding to the first vector is traversed based on an identification of each candidate neighbor vector in the candidate neighbor set, to obtain a first distance value of a connection edge corresponding to the candidate neighbor vector.

The identification of the candidate neighbor vector may be configured to represent the candidate neighbor vector of the first vector, which may be a preset identification in any form, and is not limited in the present disclosure.

In the disclosure, after the candidate neighbor set of the first vector is determined, the first distance value of the connection edge corresponding to each candidate neighbor vector may be obtained by traversing the distance set corresponding to the first vector based on the identification of the candidate neighbor vector in the candidate neighbor set.

It should be noted that, different first vectors may correspond to different distance sets, which is not limited in the disclosure.

At block 406, a second distance value between the first vector and any candidate neighbor vector is calculated in response to the distance set including no first distance value of a connection edge corresponding to the candidate neighbor vector.

In the disclosure, in the case that the distance set corresponding to the first vector is traversed based on the identification of each candidate neighbor vector in the candidate neighbor set to obtain the first distance value of the connection edge corresponding to the candidate neighbor vector, if the distance set does not include the first distance value of the connection edge corresponding to any candidate neighbor vector, the second distance value between the first vector and the any candidate neighbor vector may be directly calculated, thereby improving the flexibility and reliability of determining the distance value between the first vector and the candidate neighbor vector.

At block 407, neighbor nodes corresponding to the first vector at each level are determined based on the first distance value or the second distance value corresponding to each candidate neighbor of the first vector.

In the disclosure, after the first distance value or the second distance value corresponding to each candidate neighbor vector of the first vector is determined, based on a number threshold of the neighbor nodes of the first vector in the second parameter group and a distance value of candidate neighbor nodes of the first vector at each level, a certain number of candidate neighbor nodes with small distance values may be determined as the neighbor nodes of the first vector, in which the certain number of candidate neighbor nodes is equal to the number threshold of the neighbor nodes, which is not limited in the disclosure.

At block 408, the second edge set in the second index is constructed based on neighbor nodes corresponding to each vector at each level in the first vector database.

In the disclosure, the second edge set in the second index may be constructed based on the neighbor nodes corresponding to each vector at each level in the first vector database after the neighbor nodes corresponding to the first vector at each level are determined, thereby improving the accuracy and reliability of the constructed second edge set of the second index.

At block 409, in response to determining that construction of the second edge set in the second index is completed, the first index is deleted, and the first vector database is queried based on the second index.

For a detailed implementation of the action at block 409, reference may be made to the detailed description in other embodiments in the disclosure, which will not be described in detail here.

In embodiments of the disclosure, the first parameter group and the second parameter group are determined firstly in the case that the query request for the first vector database is received and there is no available index for the first vector database. The first index for the first vector database is constructed based on the first parameter group, and the first vector database is queried based on the first index. Then the distance set associated with the first edge set in the first index is stored, and the candidate neighbor set of the first vector in the first vector database is determined based on the construction parameter of the exploration factor (EF) in the second parameter group in the case that a preset condition is met. The distance set corresponding to the first vector is traversed based on the identification of each candidate neighbor vector in the candidate neighbor set, to obtain the first distance value of the connection edge corresponding to the candidate neighbor vector. The second distance value between the first vector and any candidate neighbor vector is calculated in the case that the distance set does not include the first distance value of the connection edge corresponding to the candidate neighbor vector. The neighbor nodes corresponding to the first vector at each level are determined based on the first distance value or the second distance value corresponding to each candidate neighbor vector of the first vector. The second edge set in the second index is constructed based on the neighbor nodes corresponding to each vector at each level in the first vector database. In the case of determining that construction of the second edge set in the second index is completed, the first index is deleted, and the first vector database is queried based on the second index. In this way, after the first index for the first vector database is constructed, the candidate neighbor vectors of the first vector are determined based on the construction parameter of the exploration factor (EF) in the second parameter group in the case that the preset condition is met. The distance values of the connection edges corresponding to the candidate neighbor vectors are determined based on the distance set associated with the first edge set in the first index. In the case that the distance set associated with the first edge set does not include the distance value of the connection edge corresponding to any candidate neighbor vector, the distance value of the connection edge of the candidate neighbor vector is determined by a direct calculation. The neighbor nodes of the first vector at each level are determined based on the distance value of each candidate neighbor vector, and the second edge set in the second index is constructed based on the neighbor nodes of each vector in the first vector database. Thus, the accuracy and reliability of generating the index and the effect of index query are improved.

To realize the above embodiments, the disclosure further provides an apparatus for generating an index.

Figure 5:
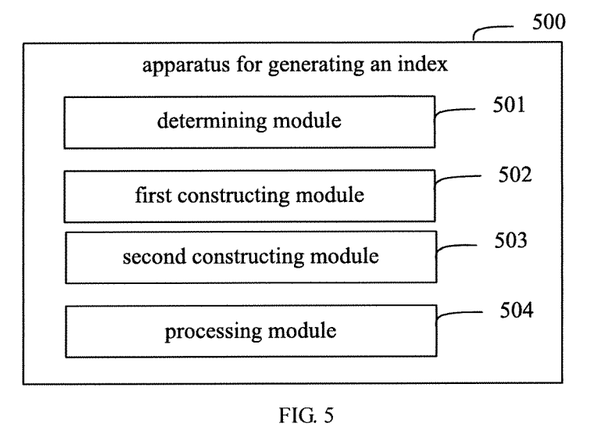
FIG. 5 is a block diagram illustrating an apparatus for generating an index according to an embodiment of the disclosure.

FIG. 5 is a block diagram illustrating an apparatus for generating an index according to an embodiment of the disclosure.

As illustrated in FIG. 5, the apparatus 500 for generating an index includes: a determining module 501, a first constructing module 502, a second constructing module 503, and a processing module 504.

The determining module 501 is configured to determine a first parameter group and a second parameter group in response to receiving a query request for a first vector database and there being no available index for the first vector database. A parameter value in the second parameter group is greater than a corresponding parameter value in the first parameter group.

The first constructing module 502 is configured to construct a first index for the first vector database based on the first parameter group, and query the first vector database based on the first index.

The second constructing module 503 is configured to construct a second index for the first vector database based on the second parameter group in response to meeting a preset condition.

The processing module 504 is configured to, in response to determining that construction of the second index is completed, delete the first index, and query the first vector database based on the second index.

In a possible implementation of the disclosure, the first constructing module 502 is further configured to:
store a distance set associated with a first edge set in the first index, in which the distance set comprises a first distance value of each connection edge in the first edge set.

The second constructing module 503 is further configured to:
construct a second edge set of the first vector database based on the second parameter group and the distance set.

In a possible implementation of the disclosure, the second constructing module 503 is further configured to:
determine a candidate neighbor set of a first vector in the first vector database based on a construction parameter of an exploration factor (EF) in the second parameter group;
traverse a distance set corresponding to the first vector based on an identification of each candidate neighbor vector in the candidate neighbor set, to obtain a first distance value of a connection edge corresponding to the candidate neighbor vector;
calculate a second distance value between the first vector and any candidate neighbor vector in response to the distance set including no first distance value of a connection edge corresponding to the candidate neighbor vector;
determine neighbor nodes corresponding to the first vector at each level based on the first distance value or the second distance value corresponding to each candidate neighbor vector of the first vector; and
construct the second edge set based on neighbor nodes corresponding to each vector in the first vector database at each level.

In a possible implementation of the disclosure, the second constructing module 503 is further configured to:
delete the first edge set.

In a possible implementation of the disclosure, the determining module 501 is configured to:
determine the first parameter group and the second parameter group based on a number of vectors comprised in the first vector database.

In a possible implementation of the disclosure, the determining module 501 is configured to:
determine two groups of parameters in any group of preset parameter pairs respectively as the first parameter group and the second parameter group.

In a possible implementation of the disclosure, the preset condition includes at least one of:
an amount of remaining resources of a system being greater than a resource amount threshold;
a duration in which an amount of remaining resources of a system is greater than a resource amount threshold being greater than a duration threshold;
receiving an instruction for constructing the second index; or
a current running period being within a preset time range.

The functions and detailed implementation principles of the above modules in the embodiment of the disclosure may refer to the above method embodiments, which are not repeated herein.

In the embodiment of the disclosure, the first parameter group and the second parameter group are determined firstly in the case that the query request for the first vector database is received and there is no available index for the first vector database. The first index for the first vector database is constructed based on the first parameter group, and the first vector database is queried based on the first index. Then the second index for the first vector database is constructed based on the second parameter group in the case that the preset condition is met. In the case of determining that the construction of the second index is completed, the first index is deleted and the first vector database is queried based on the second index. In this way, the first index for the first vector database is constructed based on the first parameter group, the second index is constructed based on the second parameter group in the case that the preset condition is met, and the first index is deleted, such that the efficiency and reliability of generating the index are improved on the basis of improving a speed for constructing the index and a query effect of the index.

According to embodiments of the disclosure, the disclosure further provides an electronic device, a readable storage medium and a computer program product.

Figure 6:
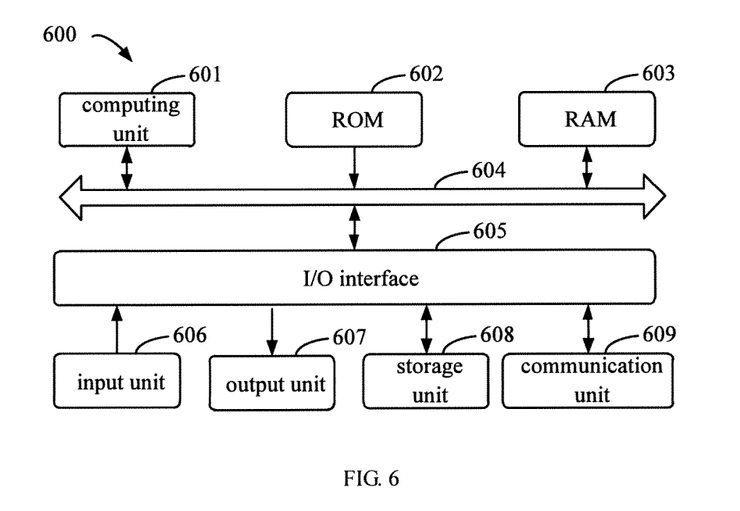
FIG. 6 is a block diagram illustrating an exemplary computer device capable of realizing implementations of the disclosure.

FIG. 6 is a block diagram illustrating an exemplary electronic device 600 capable of realizing implementations of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 6, the apparatus 600 includes a computing unit 601. The computing unit 601 may perform various appropriate actions and processes based on a computer program stored in a read only memory (ROM) 602 or loaded from a storage unit 608 into a random access memory (RAM) 603. In the RAM 603, various programs and data required for the operation of the device 600 may also be stored. The computing unit 601, the ROM 602, and the RAM 603 are connected to each other via a bus 604. An input/output (I/O) interface 605 is also connected to the bus 604.

Multiple components in the apparatus 600 are connected to the I/O interface 605. The multiple components include an input unit 606, such as a keyboard, and a mouse; an output unit 607, such as various types of displays and speakers; a storage unit 608, such as a magnetic disk, and an optical disk; and a communication unit 609, such as a network card, a modem, and a wireless communication transceiver. The communication unit 609 allows the apparatus 600 to exchange information/data with other devices via a computer network such as the Internet and/or various telecommunication networks.

The computing unit 601 may be various general-purpose and/or special-purpose processing components with processing and computing capabilities. Some examples of the computing unit 601 include, but are not limited to, a central processing unit (CPU), a graphics processing unit (GPU), various dedicated artificial intelligence (AI) computing chips, various computing units running machine learning model algorithms, a digital signal processor (DSP), and any suitable processor, controller, microcontroller, etc. The computing unit 601 performs various methods and processes described above, such as the method for generating the index. For example, in some embodiments, the method for generating the index may be implemented as a computer software program tangibly embodied in a machine-readable medium, such as the storage unit 608. In some embodiments, part or all of the computer program may be loaded and/or installed on the apparatus 600 via the ROM 602 and/or the communication unit 609. When the computer program is loaded into the RAM 603 and executed by the computing unit 601, one or more steps of the method for generating the index described above may be executed. Alternatively, in other embodiments, the computing unit 601 may be configured to perform the method for generating the index by any other suitable means (for example, by means of firmware).

Various implementations of the systems and techniques described above herein may be implemented in a digital electronic circuit system, an integrated circuit system, a field programmable gate array (FPGA), an application specific integrated circuit (ASIC), an application specific standard product (ASSP), a system on a chip (SOC), a load programmable logic device (CPLD), computer hardware, firmware, software, and/or a combination thereof. These various implementations may include being implemented in one or more computer programs. The one or more computer programs may be executed and/or interpreted on a programmable system including at least one programmable processor. The programmable processor may be a special purpose or general purpose programmable processor and receive data and instructions from and transmit data and instructions to a storage system, at least one input device, and at least one output device.

The program codes for implementing the method of the disclosure may be written in any combination of one or more programming languages. These program codes may be provided to a processor or controller of a general purpose computer, a special purpose computer, or other programmable data processing apparatus, such that the program codes, when executed by the processor or controller, cause the functions/operations specified in the flow charts and/or block diagrams to be implemented. The program codes may be executed completely on the machine, partially on the machine, partially on the machine as an independent software package and partially on a remote machine or completely on a remote machine or server.

In the context of the disclosure, a machine-readable medium may be a tangible medium, which may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, an apparatus, or a device, or any suitable combination of the above. More specific examples of the machine-readable storage medium may include one or more wire-based electrical connections, a portable computer disk, a hard disk, a RAM, a ROM, an erasable programmable read-only memory (EPROM or flash memory), an optical fiber, a portable compact disk read-only memory (CD-ROM), an optical storage device, a magnetic storage device, or any suitable combination of the above.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, speech input or tactile input).

The system and technologies described herein may be implemented in a computing system (such as, a data server) including a background component, a computing system (such as, an application server) including a middleware component, or a computing system (such as, a user computer having a graphical user interface or a web browser through which the user may interact with embodiments of the system and technologies described herein) including a front-end component, or a computing system including any combination of the background component, the middleware components and the front-end component. Components of the system may be connected to each other via digital data communication in any form or medium (such as, a communication network). Examples of the communication network include a local area network (LAN), a wide area networks (WAN), the Internet, and a blockchain network.

The computer system may include a client and a server. The client and the server are generally remote from each other and generally interact via the communication network. A relationship between the client and the server is generated by computer programs operated on a corresponding computer and having a client-server relationship with each other. The server may be a cloud server, also known as a cloud computing server or a cloud host, which is a host product in a cloud computing service system, to solve difficult management and weak business scalability in conventional physical host and VPS (virtual private server) services. The server may also be a server of a distributed system or a server combined with a blockchain.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

In addition, terms such as "first" and "second" are used herein for purposes of description and are not intended to indicate or imply relative importance or implicitly indicate the number of indicated technical features. Furthermore, the feature defined with "first" and "second" may include one or more this feature distinctly or implicitly. In the description of the disclosure, "a plurality of" means at least two, such as two, three, unless specified otherwise. In the description of the disclosure, the word "if" as used herein may be interpreted as "when" or "in a case that . . . " or "in response to a determination".

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the principle and the spirit of the disclosure shall be included in the protection scope of disclosure.

What is claimed is:

1. A method for generating an index, comprising:
   determining a first parameter group and a second parameter group in response to receiving a query request for a first vector database and there being no available index for the first vector database, wherein a parameter value in the second parameter group is greater than a corresponding parameter value in the first parameter group;
   constructing a first index for the first vector database based on the first parameter group, and querying the first vector database based on the first index;
   constructing a second index for the first vector database based on the second parameter group in response to meeting a preset condition; and
   in response to determining that construction of the second index is completed, deleting the first index, and querying the first vector database based on the second index.

2. The method of claim 1, after constructing the first index for the first vector database based on the first parameter group, further comprising:
   storing a distance set associated with a first edge set in the first index, wherein the distance set comprises a first distance value of each connection edge in the first edge set;
   wherein constructing the second index for the first vector database based on the second parameter group comprises:
   constructing a second edge set of the first vector database based on the second parameter group and the distance set.

3. The method of claim 2, wherein constructing the second edge set of the first vector database based on the second parameter group and the distance set comprises:
   determining a candidate neighbor set of a first vector in the first vector database based on a construction parameter of an exploration factor (EF) in the second parameter group;
   traversing a distance set corresponding to the first vector based on an identification of each candidate neighbor vector in the candidate neighbor set, to obtain a first distance value of a connection edge corresponding to the candidate neighbor vector;
   calculating a second distance value between the first vector and any candidate neighbor vector in response to the distance set corresponding to the first vector comprising no first distance value of a connection edge corresponding to the candidate neighbor vector;
   determining neighbor nodes corresponding to the first vector at each level based on the first distance value or the second distance value corresponding to each candidate neighbor vector of the first vector; and
   constructing the second edge set based on neighbor nodes corresponding to each vector at each level in the first vector database.

4. The method of claim 2, wherein deleting the first index comprises:
   deleting the first edge set.

5. The method of claim 1, wherein determining the first parameter group and the second parameter group comprises:
   determining the first parameter group and the second parameter group based on a number of vectors comprised in the first vector database.

6. The method of claim 1, wherein determining the first parameter group and the second parameter group comprises:
   determining two groups of parameters in any group of preset parameter pairs respectively as the first parameter group and the second parameter group.

7. The method of claim 1, wherein the preset condition comprises at least one of:
   an amount of remaining resources of a system being greater than a resource amount threshold;
   a duration in which an amount of remaining resources of a system is greater than a resource amount threshold being greater than a duration threshold;

receiving an instruction for constructing the second index; or a current running period being within a preset time range.

8. An electronic device, comprising:
   at least one processor; and
   a memory, communicatively connected with the at least one processor;
   wherein the memory is configured to store instructions executable by the at least one processor, and the instructions are executed by the at least one processor to cause the at least one processor to perform:
   determining a first parameter group and a second parameter group in response to receiving a query request for a first vector database and there being no available index for the first vector database, wherein a parameter value in the second parameter group is greater than a corresponding parameter value in the first parameter group;
   constructing a first index for the first vector database based on the first parameter group, and querying the first vector database based on the first index;
   constructing a second index for the first vector database based on the second parameter group in response to meeting a preset condition; and
   in response to determining that construction of the second index is completed deleting the first index, and querying the first vector database based on the second index.

9. The electronic device of claim 8, wherein the at least one processor is further configured to perform:
   storing a distance set associated with a first edge set in the first index, wherein the distance set comprises a first distance value of each connection edge in the first edge set;
   wherein constructing the second index for the first vector database based on the second parameter group comprises:
   constructing a second edge set of the first vector database based on the second parameter group and the distance set.

10. The electronic device of claim 9, wherein constructing the second edge set of the first vector database based on the second parameter group and the distance set comprises:
    determining a candidate neighbor set of a first vector in the first vector database based on a construction parameter of an exploration factor (EF) in the second parameter group;
    traversing a distance set corresponding to the first vector based on an identification of each candidate neighbor vector in the candidate neighbor set, to obtain a first distance value of a connection edge corresponding to the candidate neighbor vector;
    calculating a second distance value between the first vector and any candidate neighbor vector in response to the distance set corresponding to the first vector comprising no first distance value of a connection edge corresponding to the candidate neighbor vector;
    determining neighbor nodes corresponding to the first vector at each level based on the first distance value or the second distance value corresponding to each candidate neighbor vector of the first vector; and
    constructing the second edge set based on neighbor nodes corresponding to each vector at each level in the first vector database.

11. The electronic device of claim 9, wherein deleting the first index comprises:
    deleting the first edge set.

12. The electronic device of claim 8, wherein determining the first parameter group and the second parameter group comprises:
    determining the first parameter group and the second parameter group based on a number of vectors comprised in the first vector database.

13. The electronic device of claim 8, wherein determining the first parameter group and the second parameter group comprises:
    determining two groups of parameters in any group of preset parameter pairs respectively as the first parameter group and the second parameter group.

14. The electronic device of claim 8, wherein the preset condition comprises at least one of:
    an amount of remaining resources of a system being greater than a resource amount threshold;
    a duration in which an amount of remaining resources of a system is greater than a resource amount threshold being greater than a duration threshold;
    receiving an instruction for constructing the second index; or
    a current running period being within a preset time range.

15. A non-transitory computer-readable storage medium having computer instructions stored thereon, wherein the computer instructions are configured to cause the computer to perform:
    determining a first parameter group and a second parameter group in response to receiving a query request for a first vector database and there being no available index for the first vector database, wherein a parameter value in the second parameter group is greater than a corresponding parameter value in the first parameter group;
    constructing a first index for the first vector database based on the first parameter group, and querying the first vector database based on the first index;
    constructing a second index for the first vector database based on the second parameter group in response to meeting a preset condition; and
    in response to determining that construction of the second index is completed deleting the first index, and querying the first vector database based on the second index.

16. The non-transitory computer-readable storage medium of claim 15, wherein the computer instructions are configured to cause the computer to perform:
    storing a distance set associated with a first edge set in the first index, wherein the distance set comprises a first distance value of each connection edge in the first edge set;
    wherein constructing the second index for the first vector database based on the second parameter group comprises:
    constructing a second edge set of the first vector database based on the second parameter group and the distance set.

17. The non-transitory computer-readable storage medium of claim 16, wherein constructing the second edge set of the first vector database based on the second parameter group and the distance set comprises:
    determining a candidate neighbor set of a first vector in the first vector database based on a construction parameter of an exploration factor (EF) in the second parameter group;
    traversing a distance set corresponding to the first vector based on an identification of each candidate neighbor vector in the candidate neighbor set, to obtain a first distance value of a connection edge corresponding to the candidate neighbor vector;

calculating a second distance value between the first vector and any candidate neighbor vector in response to the distance set corresponding to the first vector comprising no first distance value of a connection edge corresponding to the candidate neighbor vector;

determining neighbor nodes corresponding to the first vector at each level based on the first distance value or the second distance value corresponding to each candidate neighbor vector of the first vector; and constructing the second edge set based on neighbor nodes corresponding to each vector at each level in the first vector database.

18. The non-transitory computer-readable storage medium of claim 16, wherein deleting the first index comprises:

deleting the first edge set.

19. The non-transitory computer-readable storage medium of claim 15, wherein determining the first parameter group and the second parameter group comprises:

determining the first parameter group and the second parameter group based on a number of vectors comprised in the first vector database.

20. The non-transitory computer-readable storage medium of claim 15, wherein determining the first parameter group and the second parameter group comprises:

determining two groups of parameters in any group of preset parameter pairs respectively as the first parameter group and the second parameter group.

* * * * *